3,068,260
Patented Dec. 11, 1962

3,068,260
GLUCOHEPTOSAMINIC ACID AND DERIVATIVES THEREOF AND THEIR PREPARATION
Arthur O. Rogers, Lewiston, N.Y., assignor to E. I. du Pont de Nemours and Company, Wilmington, Del., a corporation of Delaware
No Drawing. Filed Apr. 6, 1959, Ser. No. 804,130
14 Claims. (Cl. 260—429)

This invention relates to glucoheptosaminic acid, its salts and chelate complexes, and to their preparation.

For convenience sake, glucoheptosaminic acid is hereinafter referred to simply as GHAA.

GHAA is a new compound which can be readily prepared from cheap raw materials (glucose, ammonia and hydrogen cyanide). It is very soluble in water and forms chelate complexes with various metal cations and is, therefore, useful as a chelating agent.

An important object of the invention is to provide the new compounds, GHAA and salts and chelate complexes of GHAA with various metal cations. Another object is to provide a method for producing such new compounds, particularly GHAA. Still further objects will be apparent from the following description.

The objects of the invention are realized by the provision of the above new compounds and by their preparation based upon the reaction of glucose imine with hydrogen cyanide and water. The over-all reaction can be represented as follows:

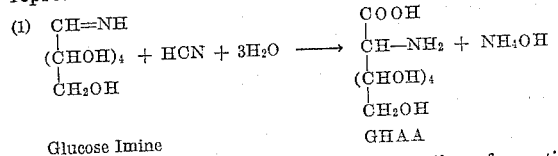

Glucose Imine                     GHAA

The reaction may involve the intermediate formation of glucoheptosaminonitrile according to the equation:

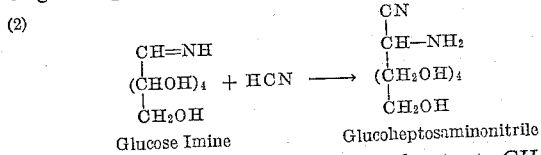

Glucose Imine          Glucoheptosaminonitrile which then hydrolyzes in the presence of water to GHAA. If such nitrile is formed as an intermediate, it hydrolyzes rapidly to GHAA since the over-all reaction is readily carried out as through it were a one-step reaction.

Although GHAA is believed to have the structure indicated by the formula shown in Equation 1, it may exist, at least partially, in a lactone form, e.g.,

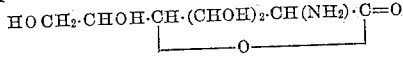

GHAA is preferably prepared by reacting glucose imine, hydrogen cyanide and water at about room temperature. The starting glucose imine can be prepared by any desired method, e.g., that described by Lobry deBruyn, Ber. 28, 3082–3084 (1895), involving the reaction of glucose with ammonia. The proportions of the reactants in the GHAA reaction can be varied considerably but it will generally be advantageous to employ at least 1 mole of hydrogen cyanide and at least 3 moles of water per mole of glucose imine. Preferably, an excess of hydrogen cyanide is used, e.g., 1.5 to 2.5 moles or more of hydrogen cyanide per mole of glucose imine. Since water is preferably employed as the reaction medium as well as a reactant, it will most generally be employed in considerable excess, e.g., in the proportion of from 10 to 60 moles or more, most preferably 20 to 35 moles, per mole of glucose imine.

While the reaction is preferably carried out at about room temperature, e.g., 20 to 30° C., higher and lower temperatures, e.g., from the freezing point of the reaction mixture to about 50° C., can be used. However, temperatures above about 30° C. are not preferred because at such temperatures darkening of the reaction mixture tends to occur with resulting impairment of the quality of the product.

It is advantageous to carry out the reaction under an inert atmosphere, e.g., nitrogen, but this is not essential. It is also advantageous to arrest the reaction before it is more than 90% completed, as measured by cyanide disappearance, to avoid excessive darkening of the product. The time required for 90% completion of the reaction is about 5.5 hours at 25° C.; shorter times are required at higher temperatures.

A non-acidic reaction mixture, i.e., one having a pH of at least 7, is essential for carrying out the reaction. Preferably, the reaction mixture will be distinctly basic, e.g., it will have a pH of at least 8 and most preferably 8 to 10. The basicity of the mixture tends to increase as the reaction proceeds. Such increase may be prevented or controlled, if desired, by the controlled addition of an acid, e.g., acetic acid or a mineral acid. The amount of acid added should, of course, not be such as to reduce the pH of the reaction mixture to below 7. Good results can be realized without addition of an acid to control pH.

The product GHAA is conveniently recovered from the reaction mixture, if recovery is desired, by adding to the mixture a water-miscible solvent until further precipitation of product ceases. Examples of such solvents are the water-miscible monohydric alcohols, such as methanol and ethanol; the water-miscible ketones, such as acetone and methylethylketone; and the water-miscible ethers, such as methylal, dimethoxyethane and dioxane. Since the product has a strong affinity for water, it is preferably dried in a water-free atmosphere. However, once dried, it is not noticeably hygroscopic.

GHAA is light pinkish-brown in color when prepared under the preferred conditions because of the presence of impurities. When more drastic reaction conditions, e.g., higher temperatures or longer reaction times, are used the product may be almost black due to impurities. The dark color is difficult to remove by ordinary methods, such as by treatment with charcoal, and it is, therefore, preferred to employ reaction conditions which do not cause excessive darkening.

The invention is illustrated by the following examples.

*Example 1*

A mixture of methanol (1200 g.) and water (25 cc.) was cooled in an ice bath and stirred while ammonia gas was fed into the mixture until 250 g. (14.7 moles) of ammonia had been absorbed. Anhydrous glucose (288 g., 1.6 moles) was dissolved in the mixture and the resulting solution was heated in an autoclave at 58 to 66° C. for 5 hours and 40 min., then allowed to cool overnight. After seeding with glucose imine crystals and stirring for 8 hours in an ice bath and overnight at room temperature, the reaction mixture was filtered to separate the precipitated glucose imine. The latter, after being washed several times with methanol and then air-dried, melted at 136–140° C.

A flask was charged with 90 g. (0.5 mole) of the above glucose imine and 250 cc. (13.9 moles) of water. The flask was swept with nitrogen and hydrogen cyanide 39 cc., 1 mole) was added from a dropping funnel with stirring. The resulting mixture was stirred at 25° C. under nitrogen for 5 hours and 20 min., at which time titration of a sample showed that hydrogen cyanide equal to 88% of the amount theoretically required for the reaction had been consumed. The reaction solution was poured into 3 liters of methanol with stirring, and stirring was continued for about 0.5 hour to complete precipitation of the product. The slurry was filtered on a sintered glass funnel covered by a rubber membrane to exclude air. The GHAA filter cake, after being washed several times with methanol and dried in a vacuum desiccator, weighed 41.6 g. (36.8% yield based on the glucose imine charged).

GHAA is very soluble in water and generally insoluble in organic solvents. Since it is difficult to purify, product obtained as described above usually differs somewhat in composition from the composition calculated for GHAA. A typical product analysis is: C, 39.48%; H, 6.67%; N, 7.09%; calculated for $C_7H_{15}NO_7$: C, 37.3%; H, 6.66%; N, 6.22%. The infrared spectrum of the product shows absorption characteristics of the

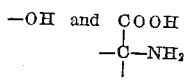

groups. GHAA reacts with ninhydrin to give a violet color characteristic of α-amino acids. Its specific rotation, $[\alpha]_D^{21°C} = +16$ (water, c=0.2).

Water-soluble salts of GHAA with various monovalent cations can be readily prepared by usual salt-forming procedures. Of particular interest are the water-soluble alkali metal salts, e.g., the sodium and potassium salts. The sodium salt can be prepared by adding sodium hydroxide to an aqueous solution of GHAA, employing 1 mole of sodium hydroxide per mole of GHAA, and evaporating the resulting solution to dryness. The potassium salt can be prepared similarly by using potassium hydroxide in place of sodium hydroxide.

A chelate complex is one in which a metal ion is bound to several active groups in a molecule of a chelating agent. Typical active groups in organic chelating agents are the carboxyl, amino and alcoholic hydroxyl groups. Since GHAA contains all of these groups, it forms chelate complexes with those metal cations which usually form complexes with organic chelating agents having the above active groups. Typical metal cations which form chelate complexes with GHAA are $Fe^{+++}$, $Fe^{++}$, $Ni^{++}$, $Co^{++}$, $Cu^{++}$, $Mn^{++}$, $Cr^{+++}$, $Al^{+++}$, $Cd^{++}$, $Zn^{++}$, $Hg^{++}$ and $Ag^+$. The complexes with some of these cations, e.g., $Cu^{++}$, $Fe^{+++}$, $Ni^{++}$ and $Co^{++}$, are more or less insoluble in water at about the neutral point, e.g., pH 6 to 8, but are usually readily soluble under more alkaline or more acidic conditions to give solutions which often are colored. While the equilibrium reactions of GHAA with the above cations favor formation of the chelate complexes, the equilibrium reactions with some cations such as $Ca^{++}$ and $Mg^{++}$ are less favorable to the formation of the chelate complex. Thus, GHAA does not chelate calcium and magnesium cations as effectively as it does, for example, copper and iron cations.

Chelate complexes with metal cations can be prepared by mixing GHAA with a solution of the desired metal cation, employing for example, equimolar amounts of GHAA and the metal cation. When the chelate complex is desired in solid form, it can be precipitated from its aqueous solution by addition thereto of a water-miscible organic solvent, e.g., methanol, or the aqueous solution can be evaporated to dryness. When the chelate complex is insoluble to about neutrality, that property can be utilized in preparing the solid form of the complex, as illustrated in Examples 2 and 3. The soluble salts of GHAA, e.g., the sodium salt, can also be used in making the chelate complexes with metal cations.

*Example 2*

Cupric sulfate pentahydrate (2.5 g., 0.01 mole) and GHAA (2.3 g., 0.01) were dissolved in about 50 cc. of water, giving a deep brown solution. Sodium hydroxide solution (0.1 N) was added gradually. No precipitate formed until about 70 cc. of the latter solution had been added. When 150 cc. had been added, the mixture had formed a precipitate which settled rapidly to leave an almost colorless solution. The precipitate was filtered off, washed with water and air-dried. Its dry weight (3.0 g.) agreed closely with that calculated for 0.01 mole of a compound containing one gram mole of GHAA per gram atom of copper. This chelate product was black and insoluble in water, methanol or dimethylformamide. It dissolved in aqueous acetic acid and in aqueous sodium hydroxide, giving deep brown solutions.

*Example 3*

Ferric ammonium sulfate $Fe_2(SO_4)_3(NH_4)_2SO_4 \cdot 24H_2O$ (0.01 mole, 9.6 g.), and GHAA (0.02 mole, 4.6 g.) were dissolved in water. The resulting solution was deep brown and strongly acidic. It was adjusted to approximately pH 7 by adding 150 cc. of 1% aqueous NaOH (0.04 mole). A brown precipitate formed, leaving the solution much lighter in color than before precipitation. The precipitate was filtered off, washed with water and air-dried; weight, 3.5 g. The dried chelate product was black and dissolved in 1% NaOH to give a dark brown solution.

*Example 4*

Manganous sulfate, $MnSO_4 \cdot H_2O$, (0.01 mole, 1.7 g), and GHAA (0.01 mole) were dissolved separately in 25 cc. portions of water. The almost colorless manganous sulfate solution was poured into the GHAA solution, darkening the color of the latter from amber to red-brown. The resulting solution was poured into 250 cc. of methanol, forming a light brownish precipitate. This was filtered off, washed with methanol and air-dried; weight, 2.9 g. When dry, the chelate product was almost white and dissolved readily in water. When ignited it burned to a brown residue of $Mn_3O_4$.

*Example 5*

Zinc sulfate, $ZnSO_4 \cdot 7H_2O$ (0.01 mole, 2.9 g.), and GHAA (0.01 mole, 2.3 g.) were dissolved in 100 cc. of water, forming a red-brown solution. The latter was poured into 500 cc. methanol, forming a light brownish precipitate. This was filtered off, washed with methanol and air-dried; weight, 2.5 g. The dry chelate product was almost white, readily soluble in water and burned to a white residue of ZnO.

*Example 6*

This example illustrates the effectiveness of GHAA in preventing the precipitation of metal hydroxides. One-tenth (0.1) gram portions of ferrous sulfate, ferric chloride, nickel sulfate and cobalt acetate were placed in separate test tubes. To each was added 5 cc. of water to dissolve the salts and then 50 cc. of a 10% sodium hydroxide solution, whereby gelatinous precipitates of the metal hydroxides occurred immediately. When the same test was repeated with 0.1 g. of GHAA added to each tube, deep red solutions were formed and no precipitation occurred.

*Example 7*

This example illustrates the use of GHAA to dissolve a normally insoluble metal compound to form a solution from which a metal can be electroplated. Approximately 0.1 g. of cadmium oxide, 0.1 g. of GHAA and 0.5 g. of sodium hydroxide were mixed with about 15 cc. of distilled water. A deep brown solution was formed. When two copper wires connected to the poles of a 6-volt dry battery were dipped in the solution, metallic cadmium was plated rapidly on the wire which formed the cathode.

Iron compounds are known to catalyze the decomposition of hydrogen peroxide. It has been found that the presence of GHAA in hydrogen peroxide containing iron compounds significantly reduces the action of the latter in catalyzing decomposition of the peroxide. This is shown by the following example.

Example 8

An aqueous solution of hydrogen peroxide containing 36.5% $H_2O_2$ by weight was divided into 2 samples, to each of which was added ferrous ammonium sulfate in an amount equivalent to 1 part per million (p.p.m.) of $Fe^{++}$, based on the weight of the solution. GHAA was added to one of the samples in an amount equal to 100 p.p.m., while no GHAA was added to the other sample. The pH of each sample was 3.2. The stabilities of the samples at 27° C. were determined by a gas evolution method. The rate of gas evolution for the sample containing GHAA corresponded to a peroxide decomposition rate of 18.5% per month. In comparison, the gas evolution rate for the control sample containing no GHAA was equivalent to complete decomposition of the peroxide in 25 days.

GHAA can be used in aqueous solutions under acidic as well as alkaline conditions to prevent the precipitation of hydroxide or other insoluble compounds of various metal cations, particularly those of the heavy metals. The water-soluble alkali metal salts of GHAA can be used for a similar purpose. Prevention of precipitation of such insoluble compounds is often desirable in aqueous baths employed, for example, in electroplating and bleaching operations.

The chelate complexes of GHAA with metal cations, e.g., $Fe^{+++}$, $Mn^{++}$, $Zn^{++}$ and others, are also useful, either in solid or solution form, as soil supplements. Thus, the ferric iron chelate complex, either in solid or solution form, can be mixed in a suitable amount with a soil that is deficient in iron. The metal chelate complex can be mixed with a solid carrier, e.g., sand, dirt or a commercial fertilizer, to be spread over the soil or mixed therewith. The proportion of metal chelate complex, or a mixture of two or more such complexes, to solid carrier can be varied considerably and will depend upon the soil to be treated and the amount of the carrier, e.g., fertilizer, that would ordinarily be applied to the soil. Fertilizer compositions containing from about 0.1 to 10%, based upon the composition weight, of the metal chelate complex will generally be satisfactory for most purposes.

I claim:

1. A compound of the group consisting of glucoheptosaminic acid, its water-soluble salts with monovalent cations, and its chelate complexes with metal cations.
2. Glucoheptosaminic acid.
3. A copper chelate complex of glucoheptosaminic acid.
4. An iron chelate complex of glutoheptosaminic acid.
5. A manganous chelate complex of glucoheptosaminic acid.
6. The zinc chelate complex of glucoheptosaminic acid.
7. The method of preparing glucoheptosaminic acid comprising reacting glucose imine, hydrogen cyanide and water in a reaction mixture having a pH of at least 7.
8. The method comprising reacting glucose imine, hydrogen cyanide and water in a reaction mixture having a pH of 8–10 and recovering glucoheptosaminic acid from the reaction mixture.
9. The method of claim 8 wherein the reaction is effected at a temperature from the freezing point of the reaction mixture to 50° C.
10. The method of claim 9 wherein the temperature is from 20 to 30° C.
11. The method of claim 9 employing from 1 to 2.5 moles of hydrogen cyanide and from 10 to 60 moles of water per mole of glucose imine.
12. The method of claim 10 employing from 1 to 2.5 moles of hydrogen cyanide and from 10 to 60 moles of water per mole of glucose imine.
13. The method of claim 8 wherein a water-miscible solvent is added to the reaction mixture to precipitate glucoheptosaminic acid.
14. The method of claim 13 wherein the solvent is methanol.

References Cited in the file of this patent

UNITED STATES PATENTS 2,943,100   Holstein _____ June 28, 1960

OTHER REFERENCES

Fischer et al.: Ber. Deut Chem. 35, 3787–3805 (1902).
Fischer et al.: Ber. Deut Chem. 36, 24–29 (1903).
Votocek et al.: Chem. Listy 29, 308–10 (1935), cited in Chem. Abs. 30, 1362[6] (1936).